UNITED STATES PATENT OFFICE.

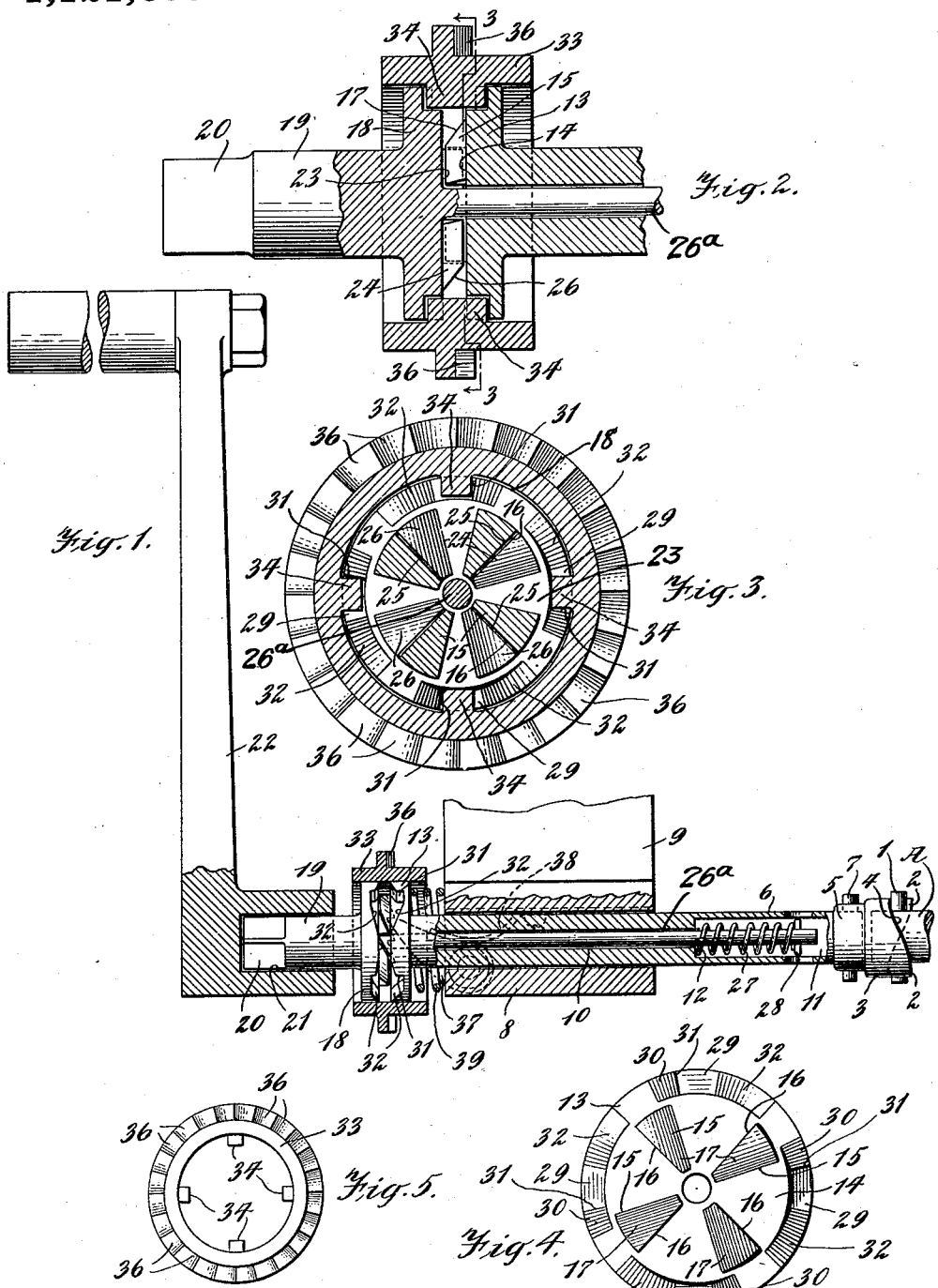

MELVILLE B. SMITH, OF NEW YORK, N. Y.

CRANKING DEVICE.

1,121,680.   Specification of Letters Patent.   Patented Dec. 22, 1914.

Application filed April 8, 1914. Serial No. 830,333.

*To all whom it may concern:*

Be it known that I, MELVILLE B. SMITH, a citizen of the United States, residing in the city of New York, borough of Queens, county of Queens, and State of New York, have invented certain new and useful Improvements in Cranking Devices, of which the following is a specification.

My invention relates broadly and generally to new and useful improvements in cranking devices for turning a shaft or other rotatable device, and is designed to be automatically disconnected from said shaft or device, should the latter for any reason rotate in the reverse direction from that in which the cranking device is rotated.

My invention is adapted to be used in connection with any rotatable shaft or device for which it is suitable, but is especially intended to be used in connection with cranking devices, either hand-operated or automatic, for turning over the driving shaft of an internal combustion engine when it is desired to start the latter.

The primary object of the invention is to provide a cranking device of improved and simplified construction, which will operate efficiently and positively to turn a shaft or other rotatable device, but which will be provided with efficient means for automatically disconnecting said cranking device from said shaft or device, should the latter for any reason be driven reversely, as, for instance, when an internal combustion engine back-fires, so as to prevent the backward motion of the shaft being communicated to the crank and causing possible injury to the operator.

The invention consists in the means to be more fully described hereinafter and the novelty of which will be particularly pointed out and distinctly claimed.

I have fully and clearly illustrated my invention in the accompanying drawings to be taken as a part of this specification and wherein:

Figure 1 is a view in side elevation, partly in section, of a cranking device embodying my invention, the same being shown connected directly to the engine motor shaft, or to a part for transmitting motion to the engine shaft. Fig. 2 is a central longitudinal detail section of the automatic clutch mechanism for connecting and disconnecting the crank with the engine shaft. Fig. 3 is a section on the line 3—3 of Fig. 2. Fig. 4 is a detail view in front elevation of one of the clutch elements. Fig. 5 is a detail view in rear elevation of a shifting device for automatically separating the clutch elements when the engine shaft is driven rearward.

Referring to the drawings by characters of reference, A designates an engine shaft, or a shaft suitably geared to or connected to the engine shaft so as to drive the latter when operated as hereinafter described. This shaft A is provided with a cross-pin 1 adapted to be engaged by the clutch faces 2 on a coupling head 3, which clutch faces are joined by inclined cam faces 4, shown in full and dotted lines at the right of Fig. 1. This coupling is provided with a socketed nipple 5 to receive one end of a transmission shaft 6, said shaft 6 being connected to said nipple by a tapered cross-pin 7 extending through the said nipple, and the end of said shaft 6, the arrangement being such that a positive driving connection will be afforded between the shaft A and the shaft 6. Means is provided, to be hereinafter described, for permitting yielding engagement between the clutch head 3 and the pin 1 on the shaft A, so that when the engine shaft A starts to rotate continuously said coupling will be disconnected from the shaft A. While I have shown this specific manner of connecting the starting device with the engine shaft, I desire it understood that I do not desire to be limited to such a connection, as any other suitable mechanical connection may be employed which will afford the proper driving of the engine shaft by the shaft 6. The shaft 6 may be arranged to turn in a bearing 8 supported beneath the transverse frame member 9 of a motor car chassis (not shown), if the starting device is to be used upon the motor of a motor vehicle. The shaft 6 is provided with a longitudinal bore 10 extending from its front portion to a point intermediate its ends, at which intermediate point it opens into a larger bore or socket 11, a shoulder or abutment 12 being formed at the point where said bores 10 and 11 join. These bores 10 and 11 are employed for a purpose to be presently described.

At its forward end the shaft 6 is provided with a clutch head 13 which may be, and preferably is, in the form of a circular disk, which disk constitutes one of the clutch members of the automatic clutch connection to be presently described. The disk 13 is formed with a flat front face 14 arranged in a plane at right-angles to the axis of rotation of said shaft 6, and on the front face of this disk are arranged radial jaws or clutch teeth 15, each formed on its front face with an engaging face 16 preferably at right-angles to the plane of the face 14, and on its rear face with an inclined or cam face 17 leading from the face 14 to the outer edge of the face 16.

Arranged to rotate in a plane parallel to the head 13 is a second clutch head, consisting preferably of a circular disk 18 of the same diameter as the disk 13, which disk is provided at its outer face with a centrally extending stub-shaft 19 formed at its outer end with a poly-faced end or head 20 to receive the correspondingly formed socket 21 on the detachable hand-operated crank 22, said stub-shaft 19 being in longitudinal alinement with the said shaft 6, heretofore described. The disk 18, just described, is formed with a face 23 disposed in a plane parallel to the plane of the face 14, heretofore described, on the disk 13, said disk 18 being provided with radial jaws or teeth 24, adapted to form an interlocking driving engagement with the teeth 15, heretofore described. These teeth 24 are provided with engaging faces 25, preferably at right-angles to the face 23 and with inclined or cam faces 26 leading outward from said face 23 to the outer edges of the faces 25. It will be understood that the engaging faces 16 on the clutch head 13 face rearward from the direction of rotation, while the faces 25 on the disk 23 face in the direction of rotation so that, when said faces 16 and 25 are engaged and the spindle or stub-shaft 19 is turned clockwise, the shaft 6 will be turned to rotate the engine shaft in proper direction to start the engine.

Formed rigid with, or connected to, the disk 18 in any suitable manner is a rod 26$^a$, which is arranged in longitudinal alinement with the spindle 19 and extends through the bore 10, heretofore described, and into the chamber 11. Surrounding that portion of the rod 26$^a$ which is located within the bore 11 is an expansion coil spring 27, one end of which abuts the shoulder 12, heretofore described, while the opposite end abuts a cross-pin 28 carried by the inner end of the rod 26$^a$. The function of this shaft 26$^a$ and spring 28 is to yieldingly hold the disk 18 in proper relation to the disk 13 to cause the teeth 24 to take position to properly engage with the teeth 15 when the stub-shaft 19 is rotated clockwise, but to permit the teeth on the disk 18 being moved out of engagement with teeth 15 on the disk 13 when the clutch parts are disconnected, by means which I will now describe.

Each of the disks 13 and 18 is provided with peripheral pockets or recesses spaced equally about the circumference of the disk, said recesses or pockets being preferably four in number, although this number may be varied to a greater or less number without departing from the scope of my invention. These recesses are preferably each formed with a bottom wall 29 arranged in a plane parallel to the plane of rotation of the disks, and leading to this bottom wall 29 in rear thereof relative to the direction of rotation, is an inclined face 30, the inner edge of which terminates at a shoulder 31 at the rear edge of said wall 29, said faces 30 and 31 serving a purpose to be presently described.

Leading from the front edge of each of the bottom walls 29 is an inclined cam surface 32, the outer edge of which terminates at the plane of the faces 14 and 23. Upon reference to the drawings it will be seen that the disks 13 and 18 are provided with equal numbers of these recesses just described, the recesses on one disk being arranged face-to-face with those on the opposite disk when the locking teeth or jaws 15 and 24 are interengaged, so that said peripheral recesses in one disk will register with those in the other disk, as clearly shown in Fig. 2. It will be seen that in the arrangement just described the cam faces 32 lead forward in the direction of rotation. Means is provided to coöperate with the peripheral recesses formed by the faces 29, 31 and 32 to positively separate the clutch elements to break the driving connection between the same by moving the disk 18 outward when the shaft 16 is driven counter-clockwise by the engine shaft. This means may consist of an annular member preferably in the form of a sleeve 33 which surrounds and incloses the heads or disks 13 and 18, heretofore described, as clearly shown in Figs. 1 and 2 of the drawings. The sleeve 33 is preferably of an internal diameter to contact or closely approach the circumferences of the disks 13 and 18, and is provided with inwardly-projecting expanders or spreaders, preferably in the form of blocks or projections 34, and in number corresponding to the number of the peripheral recesses heretofore described, and arranged to project respectively into each pair of registering recesses. These projections are of such a width longitudinally of the shafts that their ends overlap the shoulders 31 so that, when the disks 13 and 18 are rotated, as when cranking the engine, said shoulders engage the ends of said projections to cause the sleeve 33 to rotate with said disks. It will be understood that, during the running of the engine, or when the same is being cranked, this sleeve 33 may turn continuously with the engine shaft.

Surrounding the sleeve 33 and rigidly connected thereto is a circumferential flange 35 provided on one of its faces with ratchet teeth 36, the locking or engaging faces of which face rearward from the direction of rotation. Arranged to coöperate with this series of ratchet teeth is a locking pawl 37 pivoted to some point fixed relative to the shaft, which pawl runs over the teeth during the rotation of the sleeve while the engine is being cranked, said pawl being preferably urged to operative engagement with the ratchet teeth by a spring 38.

Arranged between the head 13 and a suitable fixed part, for instance, the bearing 8, is an expansive coil spring 39 surrounding the shaft 6, the purpose of which spring is to normally urge said shaft 6 away from the shaft A to disconnect the clutch head 3 from the pin 1.

The parts being as above described, the operation of the invention is as follows: The operator places the ordinary hand-crank 22, employed for starting internal combustion engines, upon the stub-shaft 19, and then pushes the shaft 6 inward to move the head 3 into position to have the clutch teeth 2 engage the pin 1, on the shaft A, to provide a driving engagement between said shafts 6 and A. The operator thereupon swings the crank 22 in the proper direction to start the engine. This serves to move the ratchet teeth 24 on the disk 18 into positive engagement with the teeth 15 on the disk 13, and thereby transmit the power from the hand-crank to the starting shaft 6 to rotate the latter. If the engine starts properly, there is no change in this relative arrangement of the parts, it being understood that the sleeve 33 turns with the clutch members, the spreaders 34 being engaged by the shoulders 31, heretofore described. Should for any reason the engine backfire, causing rotation of the shaft 6 counter-clockwise, the disk 13 will also be turned counter-clockwise, tending momentarily to turn the disk 18 rearward, due to the inter-engagement of the teeth 15 and 24. This momentary turning of the two disks 13 and 18 tends to turn the sleeve 33 rearward, but this cannot take place because said sleeve is immediately locked against rearward rotation by the pawl 37, thereby serving to hold the sleeve 33 stationary. The continued rotation of the disk 13 rearward throws the cam faces 32 in both disks against the ends of the projections 34, which serves, by a wedging or spreading action, to cause the disks 13 and 18 to be separated, the spring 27 permitting relative movement of the disks to such an extent as to disengage the teeth 15 and 24. The disk 13 is then free to rotate rearward relative to the disk 18, the clutch teeth 15 and 24 being separated to permit this rearward movement. When the engine shaft comes to rest the disks 13 and 18 will have the peripheral recesses in alinement with the spreaders 34 in said recesses, so that the parts are again in position to be operated by the hand-crank to crank the engine. When the engine starts, the pin 1, engaging the cam faces 4, disconnects the shaft A from the shaft 6, by forcing the latter outward against the inward pressure exerted by the operator against the spring 39.

What I claim and desire to secure by Letters Patent of the United States is:—

1. A device of the character described, comprising two shafts in longitudinal alinement, a clutch head on each of said shafts, said clutch heads being adapted to coöperate to transmit rotary motion from one shaft to the other, said heads having registering recesses on their adjacent faces, a member concentric with said heads and having spreader projections extending into said recesses, and means to hold said member against rotation when one of said shafts turns rearward.

2. A device of the character described, comprising two shafts in longitudinal alinement, a clutch head on each of said shafts, said clutch heads being adapted to coöperate to transmit rotary motion from one shaft to the other, said heads having registering recesses each formed with a cam face, a member concentric with said heads and having spreader projections extending into said recesses and adapted to coöperate with said cam faces to separate said heads, and means to hold said member against rotation when one of said shafts turns rearward.

3. A device of the character described, comprising two shafts in longitudinal alinement, a clutch head on each of said shafts, said clutch heads being adapted to coöperate to transmit rotary motion from one shaft to the other, said heads having registering recesses each formed with a cam face, a member concentric with said heads and having spreader projections extending into said recesses and adapted to coöperate with said cam faces to separate said heads, means to hold said member against rotation when one of said shafts turns rearward, and means to hold said heads in engagement with yielding contact.

4. A device of the character described, comprising two shafts in longitudinal alinement, a clutch head on each of said shafts, said clutch heads being adapted to coöperate to transmit rotary motion from one shaft to the other, said heads having registering recesses on their adjoining faces, each recess having a bottom wall bounded on one side by a shoulder, and on the other side by a cam face, a member concentric with said heads and having spreader projections extending into said recesses and adapted to be engaged by said shoulders to turn with the heads, and also adapted to coöperate with said cam faces to separate the heads, and means to hold said member against rotation when one of said shafts turns rearward.

5. A device of the character described, comprising two shafts in longitudinal alinement, a clutch head on each of said shafts, said clutch heads adapted to coöperate to transmit rotary motion from one shaft to the other, said heads having registering recesses on their adjoining faces, each recess having a bottom wall bounded on one side by a shoulder, and on the other side by a cam face, a member concentric with said heads and having spreader projections extending into said recesses and adapted to be engaged by said shoulders to turn with the heads, and also adapted to coöperate with said cam faces to separate the heads, means to hold said member against rotation when one of said shafts turns rearward, and means to hold said heads in yielding engagement with each other.

6. A device of the character described, comprising two shafts in longitudinal alinement, a clutch head on each shaft, said clutch heads being adapted to coöperate to transmit rotary motion from one shaft to the other, one of said shafts having a bore extending longitudinally thereof, a rod connected to the other of said shafts and extending through said bore, a spring coöperating with said rod to hold the heads in yielding engagement, a spreader device projecting between the heads, and cam faces on said heads adapted to be engaged by the spreader device to separate the heads, and means to hold the spreader device against rotation when one of said heads is turned rearward.

7. A device of the character described, comprising a shaft, a clutch head on said shaft, a second clutch head concentric with the clutch head on said shaft, said clutch heads being adapted to coöperate to transmit rotary motion from said second clutch head to said shaft, said heads having registering recesses each formed with a cam face, a member concentric with said heads having spreader projections extending into said recesses and adapted to coöperate with said cam faces to separate said heads, and means to hold said member against rotation when said shaft turns rearward.

8. A device of the character described, comprising two shafts in longitudinal alinement, a clutch head on each of said shafts, said heads having clutch projections adapted to coöperate to transmit rotary motion from one head to the other, alining recesses formed in the peripheries of said heads, each recess having an inclined cam face, a member concentric with said heads and having a spreader projection extending into said alining recesses and adapted to coöperate with the inclined faces, and means to hold said member against rotation when one of the heads is turned rearward.

9. A device of the character described, comprising two members in longitudinal alinement, a clutch head on each of said members, said clutch heads being adapted to coöperate to transmit rotary motion from one member to the other, said heads having registering recesses on their adjacent faces, a member concentric with said heads and having spreader projections extending into said recesses, and means to hold said last named member against rotation when one of said first named members turns rearward.

10. A device of the character described, comprising two shafts arranged in longitudinal alinement, a clutch head on each of said shafts, said heads being provided with clutch projections adapted to coöperate to transmit rotary motion from one head to the other, and said heads being provided with alining recesses provided with opposed cam faces leading from the bases of the recesses to the adjacent faces of the heads, a member surrounding said heads and having a spreader projection extending into said recesses and normally arranged with its opposite ends adjacent the bases of the recesses, the opposite ends of said projection being adapted to coöperate with said inclined faces to separate the heads upon rotation of the heads relative to said member, and means to hold said member against rotation when one of the heads turns rearward.

11. A device of the character described, comprising a rotary member having a clutch head thereon, a second clutch head adapted to be manually rotated, said clutch heads being adapted to coöperate to transmit rotary motion from one to the other, and having registering recesses on their adjacent faces, a member concentric with said heads and having spreader projections extending into said recesses, said projections and recesses being coöperable to disengage the clutch heads and means to hold said last-named member against rotation when said rotary member turns rearward.

12. A device of the character described, comprising a rotary member having a clutch head thereon, a second clutch head adapted to be manually rotated, said clutch heads being adapted to coöperate to transmit rotary motion from one to the other, and having registering recesses on their adjacent faces, a member concentric with said heads and having spreader projections extending inwardly therefrom, into said recesses, said projections and recesses being coöperable to disengage the clutch heads and means to hold said last-named member against rotation when said rotary member turns rearward.

13. A device of the character described, comprising a rotary member having a clutch head thereon, a second clutch head adapted to be manually rotated, said clutch heads being adapted to coöperate to transmit rotary motion from one to the other, each of said clutch heads having a recess therein, the recesses in said clutch heads registering, a member having a spreader projection extending into said recesses, said spreader and recesses being coöperable to spread the clutch heads, and means to hold said last-named member against rotation when said rotary member turns rearward.

In testimony whereof I have hereunto signed my name in the presence of two subscribing witnesses.

MELVILLE B. SMITH.

Witnesses:
JAS. N. STEWART,
C. G. HEYLMER.